Patented Sept. 24, 1946

2,408,172

UNITED STATES PATENT OFFICE 2,408,172

PROCESS FOR PREPARATION OF DIAMINES

Harold G. Johnson, Terre Haute, Ind., assignor to Commercial Solvents Corporation, Terre Haute, Ind., a corporation of Maryland No Drawing. Application July 27, 1944, Serial No. 546,936

4 Claims. (Cl. 260—583)

My invention relates to a process for the synthesis of 2-methyl-1,2-propanediamine. More particularly, it pertains to the preparation of that compound by reacting 2-nitropropane with formaldehyde in the presence of ammonia and then subjecting the resulting product to catalytic hydrogenation.

In the past 2-methyl-1,2-propanediamine has been prepared, however the procedures employed involved considerable handling of the intermediate products which, of necessity, renders such processes expensive and cumbersome.

In my copending application U. S. Serial No. 546,935, filed July 27, 1944, I have described a procedure for synthesizing 2-methyl-1,2-propanediamine by first reacting ammonia with 2-methyl-2-nitro-1-propanol under pressure at relatively low temperatures and then subjecting the resultant mixture to catalytic hydrogenation. In this process, the reactions can all be effected in one vessel without having to remove any of the intermediates therefrom at any stage of the process.

I have now discovered that 2-methyl-1,2-propanediamine can also be readily synthesized by means of a procedure which involves only a single unit operation. According to the present invention, a mixture of 2-nitropropane, ammonia, formaldehyde, and a hydrogenation catalyst is placed in a suitable bomb and sealed. The contents of the bomb are then agitated at a temperature of between about 35 and 85° C. until the pressure remains constant. Hydrogen is then introduced at a pressure of from 800 to 2000 pounds per sq. in. and at a temperature of between about 30 and 75° C. When hydrogen is no longer absorbed, the mixture is allowed to cool and the excess ammonia and hydrogen allowed to escape. The contents of the bomb are then filtered to remove the suspended catalyst, after which benzene or a similar water-immiscible liquid is added to the filtrate and the resultant mixture distilled at atmospheric pressure to remove the water formed during the reaction, as a constant boiling mixture with the benzene or other similar liquid. After all of the water has thus been removed, the excess water-immiscible liquid is driven off and the 2-methyl-1,2-propanediamine collected at a temperature of between about 122 and 124° C. in substantially pure form.

As is true with the procedure described and claimed in my copending application U. S. Serial No. 546,935, referred to above, the process of the present invention also possesses the outstanding advantage of providing this diamine in a substantially anhydrous state, whereas other similar diamines, such as for example, ethylenediamine form constant boiling mixtures with water and are generally sold as aqueous solutions in which the diamine is present in a concentration of about 65–68%.

In carrying out the process of my invention in accordance with a preferred procedure, ammonia is employed in a ratio of about 10 moles to 1 of nitropropane and formaldehyde. Also, while formaldehyde may be utilized in substantially any of its various forms, I have found it particularly satisfactory to use this reactant in the form of trioxymethylene (paraformaldehyde). Temperatures generally found most suitable for effecting the initial reaction between formaldehyde, 2-nitropropane, and ammonia lie between about 55 and 60° C., while temperatures most desirable for effecting the hydrogenation step ordinarily range between about 40 and 65° C. Substantially any hydrogenation catalyst which is active at the desired operating temperature may be employed in my process. As examples of such catalysts there may be mentioned platinum oxide, palladium charcoal, Raney nickel, and the like. In the majority of instances, I have found it preferable to use the latter as a catalyst in my process. The amount of catalyst to be employed is not critical since an excess has no harmful effect and the catalyst can usually be reused for subsequent hydrogenation steps. From 5 to 20%, based on the weight of the 2-nitropropane employed, will usually be found satisfactory.

My invention may be further illustrated by the following specific example:

Example

A mixture consisting of 2 moles of formaldehyde in the form of trioxymethylene, 2 moles of 2-nitropropane, 20 moles of liquid ammonia, and 20 g. of Raney nickel was added to a hydrogenation bomb and sealed, after which it was agitated at 60° C. until the pressure within the bomb remained constant. Agitation was then discontinued and the reaction mixture allowed to cool. Upon cooling, hydrogen was introduced at 1500 pounds pressure, after which the temperature of the reaction mixture was increased to about 60° C. When reduction was complete, heating was discontinued and after the bomb had cooled to room temperature, the pressure was slowly released and the ammonia and hydrogen permitted to escape or, if desired, these products may be collected and used in a subsequent operation. Thereafter the contents of the bomb were filtered and benzene was added to the filtrate. This mixture was then distilled at atmospheric pressure to remove the water contained therein as an azeotrope with benzene. When all of the water had thus been removed, the residue containing crude 2-methyl-1,2-propanediamine was further fractionated and the portion distilling at 122–124° C. collected. The 2-methyl-1,2-propanediamine thus obtained amounted to 86.6 g. corresponding to a conversion of 48% based on the 2-nitropropane used.

It is to be understood, of course, that the above example is merely illustrative and does not limit the scope of my invention. My invention is likewise not limited to any particular reaction conditions for effecting this reaction or to any particular method of bringing the reactants together. In general, it may be said that any modifications of procedure or the use of any equivalents which would normally occur to those skilled in the art are included within the scope of my invention.

My invention now having been described, what I claim is:

1. In a process for the production of 2-methyl-1,2-propanediamine, the steps which comprise subjecting a mixture comprising 2-nitropropane, ammonia, and formaldehyde at elevated temperature and pressure, then after said pressure remains constant subjecting the resultant mixture to hydrogenation in the presence of a hydrogenation catalyst at elevated temperature and pressure.

2. In a process for the production of 2-methyl-1,2-propanediamine, the steps which comprise reacting 2-nitropropane, ammonia, and formaldehyde at a temperature of between about 35 and 85° C. under pressure, then subjecting the resultant mixture to hydrogenation in the presence of a hydrogenation catalyst at a temperature of between about 30 and 75° C. and at a pressure of from 800 to 2,000 pounds per square inch.

3. In a process for the production of 2-methyl-1,2-propanediamine, the steps which comprise reacting 2-nitropropane with formaldehyde in the presence of ammonia under pressure at a temperature of between about 55 and 60° C., said ammonia being present in a concentration corresponding to approximately 10 moles to 1 mole of formaldehyde and 2-nitropropane, then subjecting the resultant mixture to hydrogenation in the presence of a hydrogenation catalyst at a temperature of between about 40 and 65° C. and at a pressure of between about 800 to 2,000 pounds per square inch.

4. The process of claim 3 in which formaldehyde is preesnt in the form of trioxymethylene and the hydrogenation catalyst is Raney nickel.

HAROLD G. JOHNSON.